(12) United States Patent
Shin

(10) Patent No.: US 11,737,196 B2
(45) Date of Patent: Aug. 22, 2023

(54) LED STROBOSCOPE DEVICE SYNCHRONIZED WITH CAMERA

(71) Applicant: Sun Young Shin, Daegu (KR)

(72) Inventor: Sun Young Shin, Daegu (KR)

( * ) Notice: Subject to any disclaimer, the term of this patent is extended or adjusted under 35 U.S.C. 154(b) by 0 days.

(21) Appl. No.: 17/433,173

(22) PCT Filed: Mar. 26, 2020

(86) PCT No.: PCT/KR2020/004113
§ 371 (c)(1),
(2) Date: Aug. 23, 2021

(87) PCT Pub. No.: WO2020/209532
PCT Pub. Date: Oct. 15, 2020

(65) Prior Publication Data
US 2022/0167484 A1 May 26, 2022

(30) Foreign Application Priority Data
Apr. 8, 2019 (KR) .......... 10-2019-0040799

(51) Int. Cl.
*H05B 47/16* (2020.01)
*H04N 5/225* (2006.01)
(Continued)

(52) U.S. Cl.
CPC .......... *H05B 47/16* (2020.01); *H04N 23/56* (2023.01); *H04N 23/65* (2023.01); *H05B 45/37* (2020.01)

(58) Field of Classification Search
None
See application file for complete search history.

(56) References Cited

U.S. PATENT DOCUMENTS

2007/0013557 A1* 1/2007 Wang ............... H05B 45/30
340/945
2012/0268029 A1* 10/2012 Trattler ............ G03B 15/05
315/227 R
(Continued)

FOREIGN PATENT DOCUMENTS

JP  2005-184380 A  7/2005
JP  2008-064850 A  3/2008
(Continued)

OTHER PUBLICATIONS

KR Office Action dated Aug. 18, 2020 as received in Application No. 10-2019-0040799.
(Continued)

*Primary Examiner* — Anh Q Tran
(74) *Attorney, Agent, or Firm* — Maschoff Brennan

(57) ABSTRACT

An LED stroboscope device synchronized with a camera, which comprises: a power supply unit; a stroboscope unit which receives power from the power supply unit so as to charge the power for generating a flashing light, and then, outputs a flashing light generation signal for electric discharge of the charged power; a continuous light unit which receives the power from the power supply unit so as to output a continuous light generation signal for generating continuous light; a light emitting unit which individually receives the flashing light generation signal and the continuous light generation signal so as to generate the flashing light and the continuous light; and a control unit which receives the power from the power supply unit so as to individually control the stroboscope unit and the continuous light unit, thereby outputting the flashing light generation signal and the continuous light generation signal.

9 Claims, 6 Drawing Sheets

(51) Int. Cl.
*H04N 5/232* (2006.01)
*H05B 45/37* (2020.01)
*H04N 23/56* (2023.01)
*H04N 23/65* (2023.01)

(56) References Cited

U.S. PATENT DOCUMENTS

2014/0340572 A1* 11/2014 Sato .................. G03B 7/08
 348/370
2015/0102744 A1 4/2015 Muto
2015/0330610 A1 11/2015 Song et al.
2016/0233712 A1* 8/2016 Kung .................. H02J 7/04
2020/0166823 A1* 5/2020 Peterson ............ G03B 15/02

FOREIGN PATENT DOCUMENTS

| JP | 2009-295769 A | 12/2009 |
| JP | 2015-138062 A | 7/2015 |
| KR | 10-2006-0112842 A | 11/2006 |
| KR | 10-2009-0093318 A | 9/2009 |
| KR | 10-2017-0055783 A | 5/2017 |
| KR | 20170055783 A | 5/2017 |

OTHER PUBLICATIONS

KR Decision to Grant Dated Apr. 21, 2021 as received in Application No. 10-2019-0040799.

* cited by examiner

【FIG. 1】
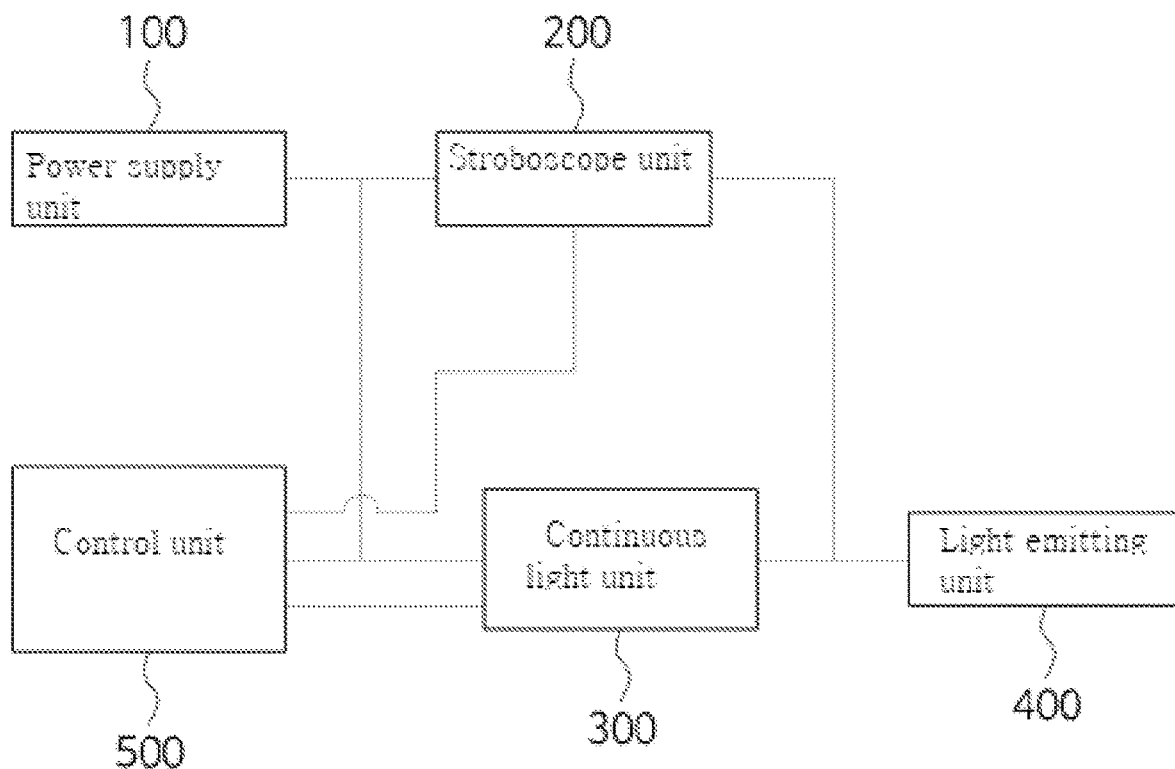
【FIG. 2】
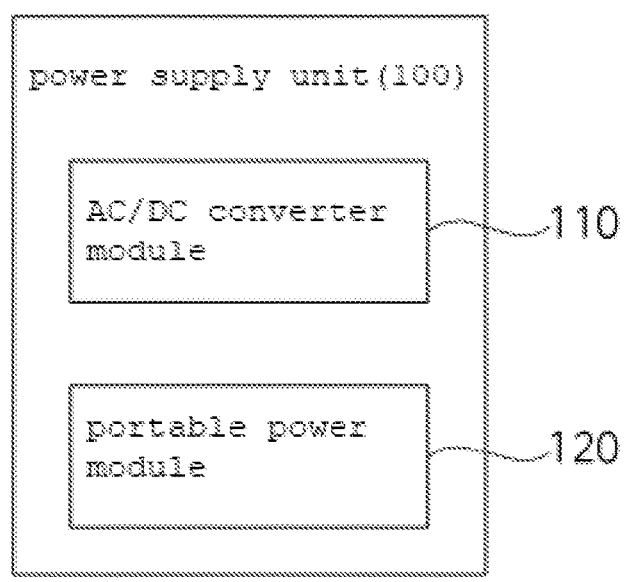

[FIG. 3]
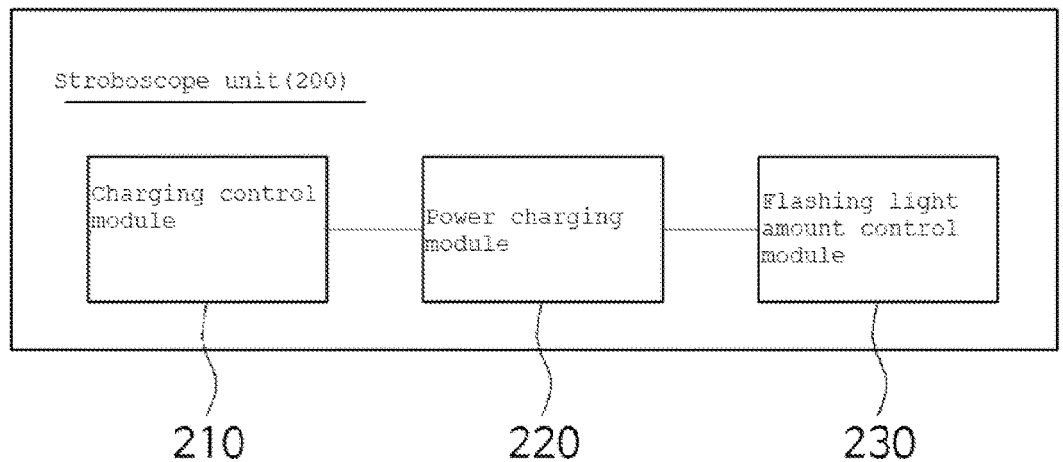
[FIG. 4]
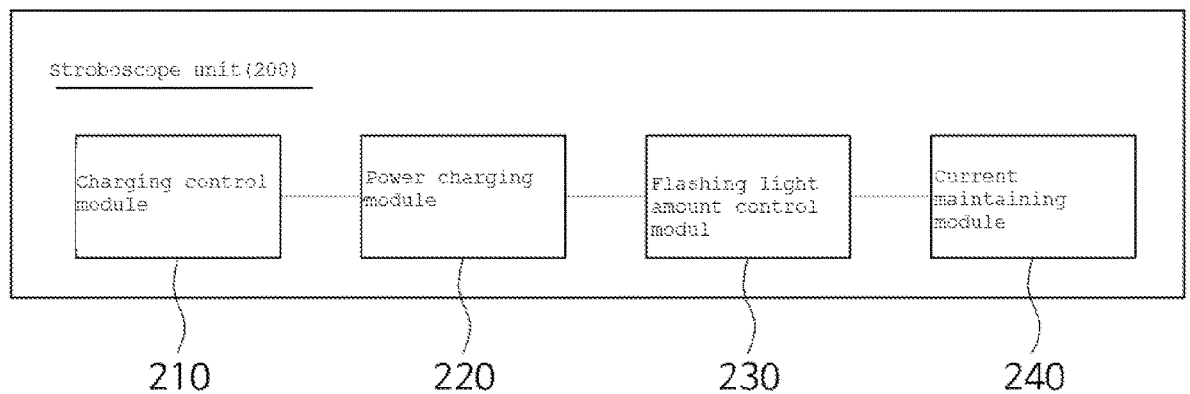

[FIG. 5]
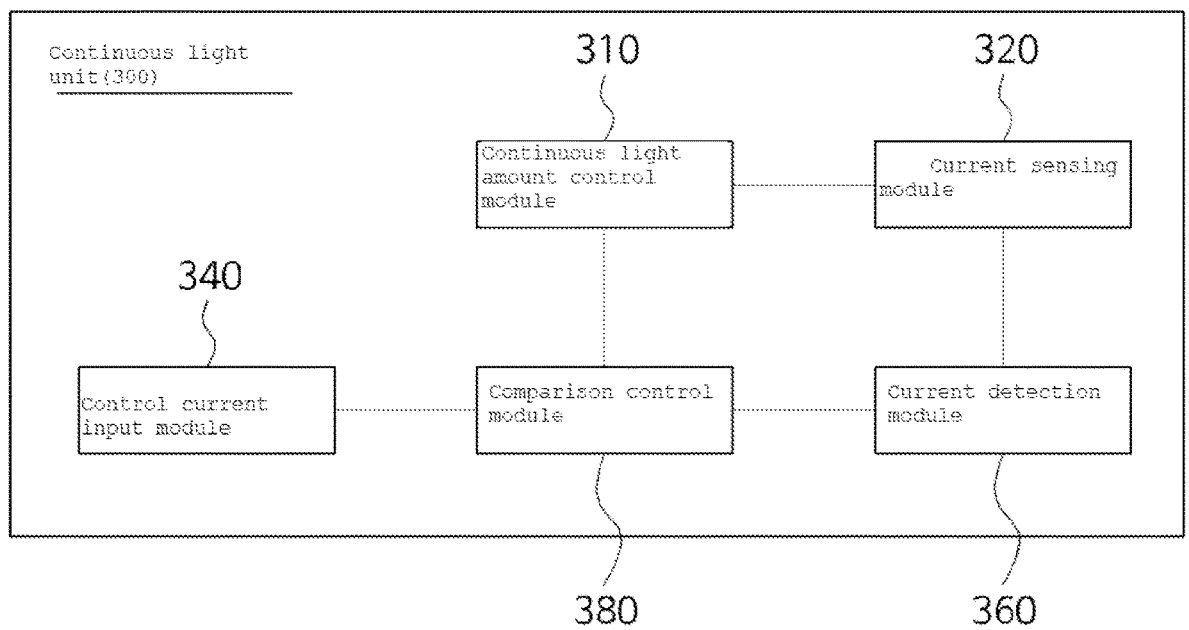

[FIG. 6]
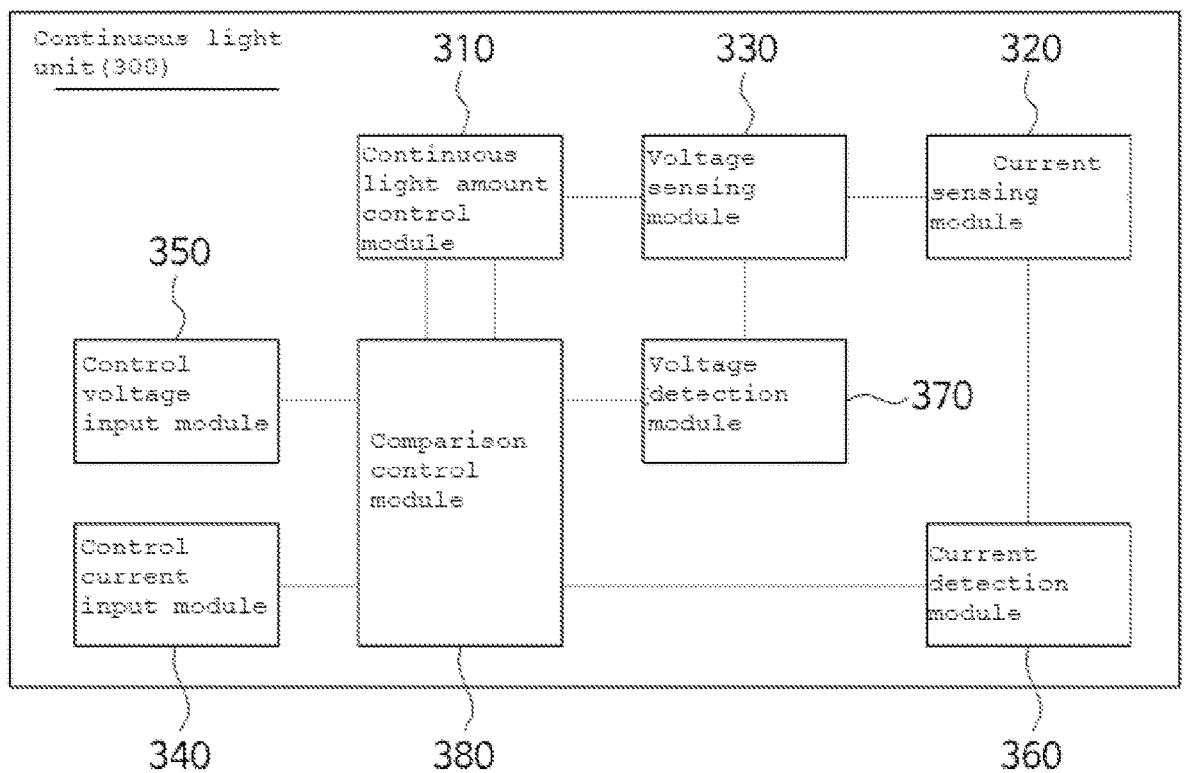

[FIG. 7]
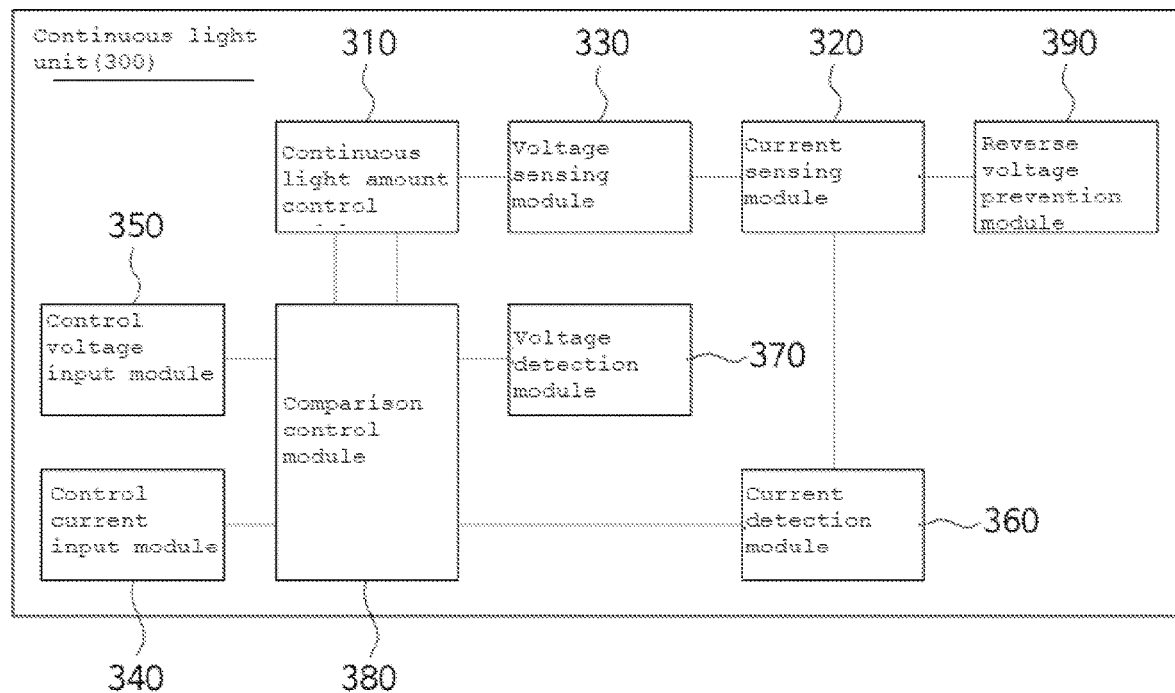
[FIG. 8]
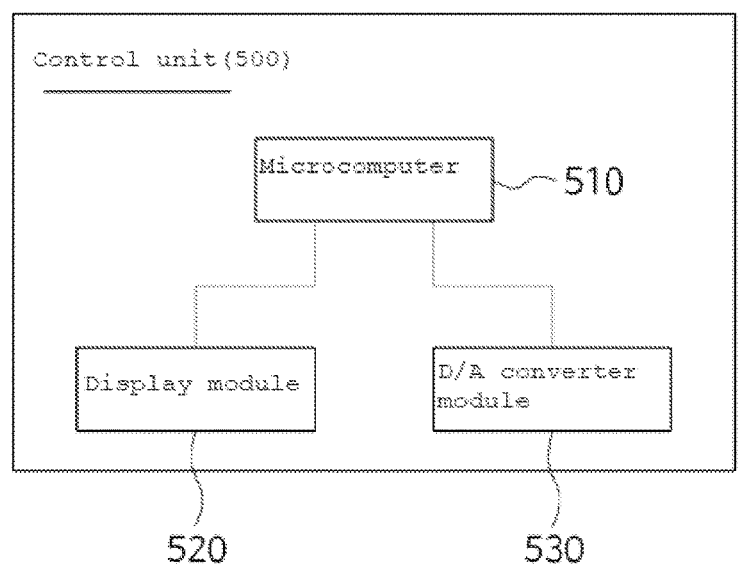

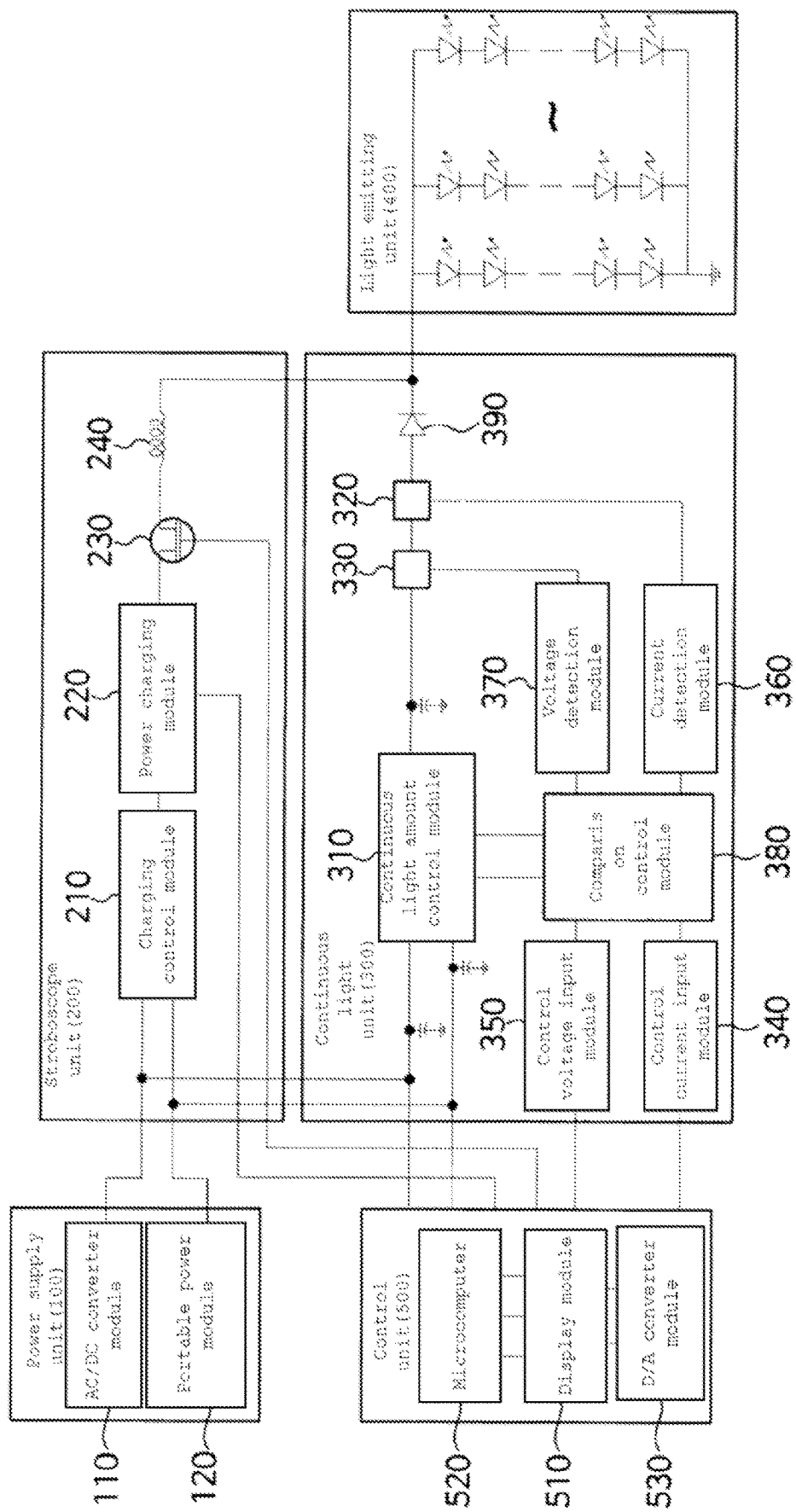
[FIG. 9]

LED STROBOSCOPE DEVICE SYNCHRONIZED WITH CAMERA

TECHNICAL FIELD

Embodiments of the present invention relate to an LED stroboscope device synchronized with a camera.

BACKGROUND ART

When a subject is photographed by using a camera device, the illuminance condition of the environment surrounding the subject greatly exerts influence on the photographing state. When photographing is performed indoors or at night where the surrounding background is dark, it is necessary to operate a strobe to produce a large amount of flashing light for a short exposure time.

The strobe emits light through the instantaneous discharge of the capacitor charged with high voltage, and the discharged capacitor is recharged to prepare for the next light emission photographing.

In the charging operation of a general strobe, the charging level is determined by detecting the charging voltage applied to both terminals of the capacitor, so that it is possible to determine whether the capacitor is fully charged by comparing with a charging limit voltage.

However, when an unintended error occurs in the detection of the charging voltage or the setting of the charging limit voltage, the strobe may be overcharged due to exceeding the acceptance limit of the capacitor. Luminance saturation may occur in photos taken with flashes exceeding the originally planned luminance, and in severe cases, stability problems such as explosion of a strobe capacitor or leakage of liquid may occur.

In addition, conventionally, by using an electrolytic capacitor as a strobe capacitor, the volume is increased by more than 20 times, charging time is required after discharging, heat is generated due to large internal resistance value, and continuous photographing with maximum output is impossible.

The present applicant has paid attention to such problems and has invented an LED stroboscope device synchronized with a camera that can solve various problems at the same time.

DISCLOSURE

Technical Problem

One object of the present invention is to provide an LED stroboscope device synchronized with a camera, which uses a high-discharge lithium-ion battery to charge a stroboscope unit, so that the LED stroboscope device has a small volume, does not require recharging time, is capable of emitting flashing light more than 20,000 times with a single charge, and is capable of continuous shooting at maximum output.

In addition, another object of the present invention is to provide an LED stroboscope device synchronized with a camera, which is provided with a current maintaining module in a stroboscope unit to induce a voltage in proportion to the amount of change in current, thereby suppressing a sudden change in current.

In addition, still another object of the present invention is to provide an LED stroboscope device synchronized with a camera, which is provided with a reverse voltage prevention module in a continuous light unit to prevent the voltage current for flashing strobe light from flowing back to the continuous light unit.

Technical Solution

To achieve above-described objects, according to the present invention, an LED stroboscope device synchronized with a camera includes power supply unit; stroboscope unit configured to receive power from the power supply unit charge power for generating a flashing light, and output a flashing generation signal for discharging charged power; a continuous light unit configured to receive power from the Power supply unit to output a continuous light generation signal for generating continuous light; a light emitting unit configured to individually receive the flashing light generation signal and the continuous light generation signal to generate the flashing light and the continuous light; and a control unit configured to receive power from the power supply unit to individually control the stroboscope unit and the continuous light unit to output the flashing light generation signal and the continuous light generation signal, wherein the stroboscope unit includes a charging control module configured to receive power from the power supply unit to charge the power in a power charging module; the power charging module configured to charge the power for generating the flashing light under control of the charging control module; and a flashing light amount control module configured to output the flashing light generation signal by a flashing light amount control signal outputted from the control unit, and wherein the power charging module includes a high-discharge battery.

The power supply unit may include an AC/DC converter module configured to convert external AC power into DC power; and a portable power module detachably mounted inside a camera, wherein the portable power module includes a portable battery.

The power charging module may include a high-discharge lithium-ion battery.

The power charging module may include a cut-off circuit used in overheating and overcurrent.

The flashing light amount control module may receive the flashing light amount control signal from the controller, and adjust a pulse width of an flashing light output voltage or a pulse width of a flashing light output current, thereby outputting the flashing light generation signal for generating a flashing light with a controlled amount of light.

The flashing light amount control module may include a field effect transistor (FET) or an insulated gate bipolar transistor (IGBT).

The stroboscope unit may further include a current maintaining module provided between the flashing light amount control module and the light emitting unit to prevent a flashing light output current moving from the power charging module to the light emitting unit from being abruptly changed.

The continuous light unit may include a continuous light amount control module configured to receive power from the power supply unit to output the continuous light generation signal; a current sensing module configured to sense a continuous light output current output from the continuous light amount control module; a control current input module configured to receive a control current matching a light amount value set by the control unit from a corresponding control unit; a current detection module configured to detect the continuous light output current sensed by the current sensing module; and a comparison control module configured to compare the control current input through the control current input module with the continuous light output current detected through the current detection module to output a continuous light amount control signal to the continuous light amount control module, wherein the continuous light amount control module receives the continuous light amount control signal from the comparison control module and modulates a pulse width of the continuous light output current to output the continuous light generation signal for generating the continuous light with a controlled light amount.

The continuous light unit may further include a voltage sensing module configured to sense a continuous light output voltage output from the continuous light amount control module; a control voltage input module configured to receive a control voltage matching the light amount value set the control unit from a corresponding control unit; and a voltage detection module configured to detect the continuous light output voltage sensed by the voltage sensing module, wherein the comparison control module is configured to compare the control current input through the control current input module with the continuous light output current detected through the current detection module to output the continuous light amount control signal to the continuous light amount control module, and wherein the continuous light amount control module receives the continuous light amount control signal from the comparison control module and modulates the pulse width of the continuous light output current to output the continuous light generation signal for generating the continuous light with the controlled light amount.

The continuous light unit may further include a reverse voltage prevention module provided between the continuous light amount control module and the light emitting unit to prevent a flashing light output current generated from the stroboscope unit from flowing back to the continuous light unit, wherein the reverse voltage prevention module includes a diode.

The light emitting unit may include one light emitting module to generate both the flashing light and the continuous light from a corresponding light emitting module.

The control unit may include a microcomputer configured to receive power from the power supply unit and set a program function for controlling the stroboscope unit and the continuous light unit, respectively, to detect states of a corresponding stroboscope unit and a corresponding continuous light unit; a display module configured to display the program function set by the microcomputer and a control state; and a D/A converter module configured to convert a digital signal set by the microcomputer into an analog signal, wherein the microcomputer detects a charging voltage of the power charging module, outputs a pulse width control signal for adjusting the flashing light amount to have a brightness matching a corresponding charging voltage and a camera exposure value as the flashing light amount control signal, and transmits the flashing light amount control signal to the light amount control module.

Advantageous Effects

As described above, according to the present invention, the LED stroboscope device synchronized with a camera uses a high-discharge lithium-ion battery to charge a stroboscope unit, so that the LED stroboscope device has a small volume, does not require recharging time, can emit flashing light more than 20,000 times with a single charge, and is capable of continuous shooting at maximum output.

In addition, according to the present invention, the LED stroboscope device synchronized with a camera is provided with the current maintaining module in the stroboscope unit to induce a voltage in proportion to the amount of change in current, thereby suppressing a sudden change in current.

In addition, according to the present invention, rye LED stroboscope device synchronized with a camera is provided with the reverse voltage prevention module in the continuous light snit to prevent the voltage current for flashing strobe light from flowing back to the continuous light unit.

DESCRIPTION OF DRAWINGS

FIG. 1 is a block diagram illustrating an LED stroboscope device synchronized with a camera according to the present invention.

FIG. 2 is a block diagram of a power supply unit according to the present invention.

FIG. 3 is a block diagram illustrating a first configuration of a stroboscope unit according to the present invention.

FIG. 4 is a block diagram illustrating a second configuration diagram of a stroboscope unit according to the present invention.

FIG. 5 is a block diagram illustrating a first configuration of a continuous light unit according to the present invention.

FIG. 6 is a block diagram illustrating a second configuration of a continuous light unit according to the present invention.

FIG. 7 is a block diagram illustrating a third configuration of a continuous light unit according to the present invention.

FIG. 8 is a block diagram illustrating a control unit according to the present invention.

FIG. 9 is a circuit diagram illustrating an LED stroboscope device synchronized with a camera according to the present invention.

BEST MODE

Hereinafter, exemplary embodiments of the present invention will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present invention.

FIG. 1 is a block diagram illustrating an LED stroboscope device synchronized with a camera according to the present invention.

As shown in FIG. 1, the LED stroboscope device synchronized with a camera according to the present invention includes a power supply unit 100, a stroboscope unit 200, a continuous light unit 300, a light emitting unit 400, and a control unit 500.

The power supply unit 100 may supply power to the stroboscope unit 200, the continuous unit 300, and the control unit 500. The power supply unit 100 may supply power for charging to the stroboscope unit 200, and may also supply operating power to the continuous light unit 300 and the control unit 500, respectively.

FIG. 2 is a block diagram of a power supply unit according to the present invention.

In detail, as shown in FIG. 2, the power supply unit 100 may include an AC/DC converter module 110 and a portable power module 120.

The AC/DC converter module 110 may convert AC power supplied from an outside into DC power. The AC/DC converter module 110 may convert external 100~240V AC power into DC power usable in the LED stroboscope device and supplies the DC power to the stroboscope unit 200, the continuous light unit 300 and the control unit 500.

The portable power module 120 is detachably mounted inside the camera to supply DC power to the stroboscope unit 200, the continuous light unit 300 and the control unit 500. In this case, the portable power module 120 may include various portable batteries.

The stroboscope unit 200 may receive power from the power supply unit, charge power for generating flashing light therein, and then output a flashing light generation signal for discharging the charged power.

FIG. 3 is a block diagram illustrating a first configuration of a stroboscope unit according to the present invention.

In detail, as shown in FIG. 3, the stroboscope unit 200 may include a charging control module 210, a power charging module 220, and a flashing light amount control module 230.

The charging control module 210 may receive power from the power supply unit to charge the power to the power charging module.

In detail, the charging control module 210 may check the charged power pre-charged in the power charging module 220, and when the corresponding charged power is less than or equal to a preset value, the power charging module may be charged with the corresponding power by using the power input from the power supply unit.

The power charging module 220 may charge power for flashing light generation under control of the charging control module.

In detail, the power charging module 220 may include a high-discharge battery. In particular, the power charging module 220 may use a high-discharge lithium-ion battery as the high-discharge battery, and may also block the circuit in case of overheating or overcurrent.

The high-discharge lithium-ion battery may maintain a constant voltage and may be used only as flashing light to generate a uniform amount of light. For example, a high-discharge lithium-ion battery having a 2500 mA specification (continuous discharge rate: 20 A, instantaneous discharge rate: 95 A<0.5 sec, 65 A<1 sec) may be used, and when the instantaneous discharge rate is 10 msec, since the high-discharge lithium-ion battery is at least 50 C (50 times) or more, there are many advantages over the case of using a conventional electrolytic capacitor.

That is, according to the present invention, the conventional electrolytic capacitor may be replaced with the high-discharge lithium-ion battery by replacing as a charging element for configuring the power charging module 220, so that the volume is small, no recharging Lime is required, flashing light is emitted more than 20,000 times per charge, and continuous photographing with maximum a is possible.

In this case, relation to the high-discharge lithium-ion battery that can emit light more than 20,000 times per charge, for example, when the high-discharge lithium-ion battery is a 100 W battery, and light is emitted at 100 W, it is possible to emit light for 1 sec 3,600 times which is 60 parts×60, light for 0.1 sec 36,000 times, light for in 0.01 sec (10 msec) 360,000 times. When light is emitted at 1000 W which is 10 times of 100 W, it is possible to emit light for 10 msec 36,000 times.

The flashing light amount control module 230 may output a flashing light generation signal according to the flashing light amount control signal output from the control unit 500.

In detail, as will be described later, the control unit 500 may detect the charged voltage charged in the power charging module 220 and also measure the camera exposure value to calculate the light amount value of the flashing light generated from the light emitting unit 400 based on the corresponding charged voltage and the camera exposure value. The control unit 500 may generate a flashing light amount control signal that is a pulse width control signal to match the corresponding light amount value and transmit it to the flashing light amount control module 230.

Accordingly, the flashing light amount control module 230 may receive the flashing light amount control signal from the control unit and output the flashing light generation signal for adjusting the pulse width of the flashing light output voltage or the pulse width of the flashing light output current, so that the light emitting unit 400 generates an flashing light of which the amount of light is adjusted.

In this case, the flashing light amount control module 230 may include a field effect transistor (FET) or an insulated gate bipolar transistor (IGBT). The flashing light amount control module 230 may adjust the light amount by changing the pulse width of the flashing light output voltage or the pulse width of the flashing light output current from 1 µs to 20 mS according to the camera exposure value through the flashing light amount control signal. In particular, when the charged voltage charged in the power charging module 220 is low, the amount of light may be corrected making the pulse width longer than the calculated pulse width.

FIG. 4 is a block diagram illustrating a second configuration diagram of a stroboscope unit according to the present invention.

Meanwhile, as shown in FIG. 4, in addition to the charging control module 210, the power charging module 220 and the flashing light amount control module 230, the stroboscope unit 200 may further include a current maintaining module 240.

The current maintaining module 240 is provided between the flashing light amount control module 230 and the light emitting unit 400 to prevent a sudden current change of the flashing light output current moving from the power charging module to the light emitting unit.

In detail, the current maintaining module 240 may include an inductor, a capacitor, a resistor, or a combination thereof for moving a predetermined current to the light emitting unit. The current maintaining module 240 may induce a voltage in proportion to the change amount of a current to suppress a sudden change in the current, thereby improving the stability of the electronic circuit constituting the stroboscope unit 200.

The continuous light unit 300 may receive power from the power supply unit and output a continuous light generation signal for generating continuous light.

FIG. 5 is a block diagram illustrating a first configuration of a continuous light unit according to the present invention.

In detail, as shown in FIG. 5, the continuous light unit 300 may include a continuous light amount control module 310, a current sensing module 320, a control current input module 340, a current detection module 360, and a comparison control module 380.

The continuous light amount control module 310 may receive power from the power supply unit and output a continuous light generation signal.

In detail, the continuous light amount control module 310 may receive a continuous light amount control signal from the comparison control module 380. The continuous light amount control module 310 may output a continuous light generation signal that modulates the pulse width of the continuous light output current with a pulse width matching the continuous light amount control signal, so that the light emitting unit generates continuous light with the adjusted light amount.

The current sensing module 320 may sense a continuous light output current output from the continuous light amount control module.

In detail, the current sensing module 320 may include a current sensor. The current sensing module 320 may be provided on a rear end of the continuous light amount control module to sense the continuous light output current flowing into the light emitting unit.

The control current input module 340 may receive a control current matching the light amount value set by the control unit from the corresponding control unit.

In detail, after measuring the camera exposure value to calculate the light amount value of the continuous light generated from the light emitting unit 400 based on the camera exposure value, the control unit 500 may generate a control current matching the corresponding light amount value and transfer it to the control current input module 340. Then, the control current input module 340 may receive the control current from the control unit and transmit it to the comparison control module 380.

The current detection module 360 may detect the continuous light output current sensed by the current sensing module.

In detail, the current detection module 360 may be provided between the current sensing module 320 and the comparison control module 380. The current detection module 360 may transmit the continuous light output current value sensed by the current sensing module 320 to the comparison control module 380.

The comparison control module 380 may compare the control current input through the control current input module 340 with the continuous light output current detected through the current detection module to output the continuous amount control signal to the continuous light amount control module 310.

In detail, when the control current and the continuous light output current are different from each other, the comparison control module 380 may generate a continuous light amount control signal that is a pulse width modulation signal for matching the continuous light output current value with the control current value and may transmit the continuous light amount control signal to the continuous light amount control module 310.

Accordingly, the continuous light amount control module 310 may modulate the pulse width of the continuous light output current into the pulse width, matching the corresponding continuous light amount control signal according to the continuous amount control signal transmitted from the continuous light amount control module 310, and provide it to the light emitting unit, so that it is possible to allow the light emitting unit to generate continuous light with the light amount value set by the control unit.

FIG. 6 is a block diagram illustrating a second configuration of a continuous light unit according to the present invention.

Meanwhile, as shown in FIG. 6, in addition to the continuous light amount control module 310, the current sensing module 320, the control current input module 340, the current detection module 360 and the comparison control module 380 described above, the continuous light unit 300 may further include a voltage sensing module 330, a control voltage input module 350 and a voltage detection module 370.

The voltage sensing module 330 may sense a continuous light output voltage output from the continuous light amount control module.

In detail, voltage sensing module 330 may include a voltage sensor. The voltage sensing module 330 may be provided between the continuous light amount control module and the current sensing module to sense the continuous light output voltage applied to a point between the continuous light amount control module and the current sensing module.

The control voltage input module 350 may receive a control voltage matching the light amount value set by the control unit from the corresponding control unit.

In detail, after measuring the camera exposure value co calculate the light amount value of the continuous light generated from the light emitting unit 400 based on the camera exposure value, the control unit 500 may generate a control voltage matching the corresponding light amount value and transfer it to the control voltage input module 350. Then, the control voltage input module 350 may receive the control voltage from the control unit and transmit it to the comparison control module 380.

The voltage detection module 370 may detect the continuous light output voltage sensed the voltage sensing module.

In detail, the current detection module 370 may be provided between the voltage sensing module 330 and the comparison control module 380. The voltage detection module 370 may transmit the continuous light output voltage value sensed by the voltage sensing module 330 to the comparison control module 380.

In this case, the comparison control module 380 may compare the control voltage input through the control voltage input module 350 with the continuous light output voltage detected through the voltage detection module to output the continuous light amount control signal to the continuous light amount control module 310.

In detail, when the control voltage and the continuous light output voltage are different from each other, the comparison control module 380 may generate a continuous light amount control signal that is a pulse width modulation signal for matching the continuous light output voltage value with the control voltage value and may transmit the continuous light amount control signal to the continuous light amount control module 310.

Accordingly, the continuous light amount control module 310 may output continuous light generation signal for modulating the pulse width of the continuous light output voltage into the pulse width matching the corresponding continuous light amount control signal according to the continuous light amount control signal transmitted from the continuous light amount control module 310, and provide it to the light emitting unit, so that it is possible to allow the light emitting unit to generate continuous light with the light amount value set by the control unit.

That is, the comparison control module 380 may compare the control current input through the control current input module and the control voltage input through the control voltage input module with the continuous light output current detected through the current detection module and the continuous light output voltage detected through the voltage detection module, respectively, and output the continuous light amount control signal to the continuous light amount control module. In addition, the continuous light amount control module 310 may receive the continuous light amount control signal from the comparison control module, output the continuous light generation signal that modulates the pulse width of the continuous light output current or the continuous light output voltage, and provides it to the light emitting unit, so that it is possible to generate continuous light whose light amount is adjusted according to the light amount value set by the control unit.

FIG. 7 is a block diagram illustrating a third configuration of a continuous light unit according to the present invention.

Meanwhile, as shown in FIG. 7, in addition to the continuous light amount control module 310, the current sensing module 320, the control current input module 340, the current detection module 360, the comparison control module 380, the voltage sensing module 330, the control voltage input module 350 and the voltage detection module 370 described above, the continuous light unit 300 may further include a reverse voltage prevention module 390.

The reverse voltage prevention module 390 may be provided between the continuous light amount control module and the light emitting unit to prevent the flashing light output current generated from the stroboscope unit from flowing back into the continuous light unit.

In detail, the reverse voltage prevention module 390 may include a reverse voltage prevention diode. As will be described later, for example, when the reverse voltage prevention module 390 has a structure in which the light emitting unit 400 generates both flashing light and continuous light and continuous light through one light emitting module and the light emitting unit generates the flash light based on the flashing light output, the stability of the electronic circuit constituting the continuous light unit 300 may be improved by preventing the corresponding flashing light output current from flowing to the continuous light unit.

The light emitting unit 400 may receive the flashing generation signal and the continuous light generation signal, respectively, and may generate flashing light and continuous light.

In detail, the light emitting unit 400 may include one light emitting module and both flashing light and continuous light may be generated from the corresponding light emitting module. When the continuous light generation signal is received from the continuous light unit 300, the light emitting unit 400 may generate continuous light with a brightness value set by the control unit. In addition, when receiving the flashing light generation signal from the stroboscope unit 200 while maintaining the continuous light, the light emitting unit 400 may generate the flashing light by flowing a current 5 to 20 times as much as the set pulse width.

The control unit 500 may receive power from the power supply unit and control the stroboscope unit and the continuous light unit, respectively, to output the flashing light generation signal and the continuous light generation signal.

FIG. 8 is a block diagram illustrating a control unit according to the present invention.

In detail, as shown in FIG. 8, the control unit 500 may include a microcomputer 510, a display module 520 and a D/A converter module 530.

The microcomputer 510 may receive power from the power supply unit and set a program function of controlling the stroboscope unit and the continuous light unit, respectively, to detect the states of the corresponding stroboscope unit and the continuous light unit.

In detail, the microcomputer 510 may detect the charged voltage of the power charging module and outputs a pulse width control signal for controlling the flashing light amount to the brightness matching the corresponding charged voltage and the camera exposure value as the flashing light amount control signal to the light amount control module.

That is, the microcomputer 510 may detect the charging voltage charged in the power charging module 220 and also measure the camera exposure value, thereby calculating the light amount value of the flashing light generated from the light emitting unit 400 based on the charged voltage and the camera exposure value. In addition, the microcomputer 510 may generate the flashing light amount control signal that is a pulse width control signal to match the corresponding light amount value and transmit it to the flashing light amount control module 230.

Accordingly, when a camera shutter signal is input, the microcomputer 510 may generate the flashing light amount control signal and transmit it to the flashing light amount control module, thereby controlling the light emitting unit to generate the set light amount of flashing light. In addition, when a camera shutter signal is output, the microcomputer 510 may generate a flashing light amount control signal and transmit it to the flashing light amount control module. At the same time, the microcomputer 510 may transmit a control current and a control voltage matching the set light amount value to the continuous light unit 300, thereby controlling the light emitting unit to emit the set amount of continuous light.

Meanwhile, when a camera TTL signal is input, the microcontroller 510 may generate the flashing light amount control signal matching the set value of the camera TTL signal and then, transmit it to the flashing light amount control module, thereby controlling the light emitting unit to generate the set amount of flashing light.

The display module 520 may display a program function and a control state set by the microcomputer, and the display module 520 may include an OLED display.

The D/A converter module 530 may convert a digital signal set by the microcomputer into an analog signal.

FIG. 9 is a circuit diagram illustrating an LED stroboscope device synchronized with a camera according to the present invention.

As shown in FIG. 9, according to present invention, the power charging module 220 of the stroboscope unit 200 may include a high-discharge lithium-ion battery into which power for generating flashing light generation is charged. The flashing light amount control module including a field effect transistor (FET) or an insulated gate bipolar transistor (IGBT) 230 may receive the flashing light amount control signal from the control unit 500 and output the flashing light generation signal for controlling the pulse width of the flashing light output voltage or the pulse width of the flashing light output current to generate flashing light through the light emitting unit. In addition, the current maintaining module 240 including an inductor may have a structure capable of suppressing a sudden change in current moving to the light emitting part.

In addition, the comparison control module 380 of the continuous light unit 300 may compare the control current and the control voltage respectively input from the control unit with the continuous light output current and the continuous light output voltage detected in the continuous light unit circuit to output the continuous light amount control signal. The continuous light amount control module 310 may output the continuous light generation signal for modulating the pulse width of the continuous light output current or continuous light output voltage based on the continuous amount control signal, thereby generating the continuous light through the light emitting unit. The reverse voltage prevention module 390 including a diode may have a structure capable of preventing the flashing light output current from flowing to the continuous light unit.

As described above, according to the present invention, since the strobe has a high-discharge lithium-ion battery, the strobe may have a small volume, not require recharging time, emit flashing light multiple times with a single charge, and perform continuous shooting at maximum output. In addition, the strobe is provided with the current maintaining module in the stroboscope unit to induce a voltage in proportion to the amount of change in current, thereby suppressing a sudden change in current. In addition, the strobe is provided with the reverse voltage prevention module in the continuous light unit to prevent the voltage current for flashing strobe light from flowing back to the continuous light unit.

As described above, the LED stroboscope device synchronized with a camera according to the present invention has been described with reference to the drawings, but the present invention is not limited by the embodiments and drawings disclosed herein, and within the scope of the technical spirit of the present invention of course, various modifications may be made by those skilled in the art.

| [Description of Reference Numeral] |
| --- |
| 100: Power supply unit |
| 110: AC/DC converter module |
| 120: Portable power module |
| 200: Stroboscope unit |
| 210: Charging control module |
| 220: Power charging module |
| 230: Flashing light amount control module |
| 240: Current maintaining module |
| 300: Continuous light unit |
| 310: Continuous light amount control module |
| 320: Current sensing module |
| 330: Voltage sensing module |
| 340: Control current input module |
| 350: Control voltage input module |
| 360: Current detection module |
| 370: Voltage detection module |
| 380: Comparison control module |
| 390: Reverse voltage prevention module |
| 400: Light emitting unit |
| 500: Control unit |
| 510: Microcomputer |
| 520: Display module |
| 530: D/A converter module |

The invention claimed is:

1. An LED stroboscope device synchronized with a camera, the LED stroboscope device comprising:
   a power supply unit;
   a stroboscope unit configured to receive power from the power supply unit to charge power for generating a flashing light, and output a flashing light generation signal for discharging charged power;
   a continuous light unit configured to receive power from the power supply unit to output a continuous light generation signal for generating continuous light;
   a light emitting unit configured to individually receive the flashing light generation signal and the continuous light generation signal to generate the flashing light and the continuous light; and
   a control unit configured to receive power from the power supply unit to individually control the stroboscope unit and the continuous light unit to output the flashing light generation signal and the continuous light generation signal,
   wherein the stroboscope unit includes a charging control module configured to receive power from the power supply unit to charge the power in a power charging module;
   the power charging module configured to charge the power for generating the flashing light under control of the charging control module; and
   a flashing light amount control module configured to output the flashing light generation signal by a flashing light amount control signal outputted from the control unit,
   wherein the power charging module includes a high-discharge battery,
   wherein the power supply unit includes:
      an AC/DC converter module configured to convert AC power into DC power; and
      a portable power module detachably mounted inside a camera,
   wherein the portable power module includes a portable battery,
   wherein the power charging module includes a high-discharge lithium-ion battery, and
   wherein the power charging module includes a cut-off circuit used in overheating and overcurrent.

2. The LED stroboscope device of claim 1, wherein the flashing light amount control module receives the flashing light amount control signal from the controller, and adjusts a pulse width of flashing light output voltage or a pulse width of a flashing light output current, thereby outputting the flashing light generation signal for generating a flashing light with a controlled amount of light.

3. The LED stroboscope device of claim 2, wherein the flashing light amount control module includes a field effect transistor (FET) or an insulated gate bipolar transistor (IGBT).

4. The LED stroboscope device of claim 3, wherein the stroboscope unit further includes a current maintaining module provided between the flashing light amount control module and the light emitting unit to prevent a flashing light output current moving from the power charging module to the light emitting unit from being abruptly changed.

5. The LED stroboscope device of claim 4, wherein the continuous light unit includes:
   a continuous light amount control module configured to receive power from the power supply unit to output the continuous light generation signal;
   a current sensing module configured to sense a continuous light output current output from the continuous light amount control module;
   a control current input module configured to receive a control current matching a light amount value set by the control unit from a corresponding control unit;
   a current detection module configured to detect the continuous light output current sensed by the current sensing module; and
   a comparison control module configured to compare the control current input through the control current input module with the continuous light output current detected through the current detection module to output a continuous light amount control signal to the continuous light amount control module, and
   wherein the continuous light amount control module receives the continuous light amount control signal from the comparison control module and modulates a pulse width of the continuous light output current to output the continuous light generation signal for generating the continuous light with a controlled light amount.

6. The LED stroboscope device of claim 5, wherein the continuous light unit further includes:

a voltage sensing module configured to sense a continuous light output voltage output from the continuous light amount control module;

a control voltage input module configured to receive a control voltage matching the light amount value set by the control unit from a corresponding control unit; and a voltage detection module configured to detect the continuous light output voltage sensed by the voltage sensing module, wherein the comparison control module is configured to compare the control current input through the control current input module with the continuous light output current detected through the current detection module to output the continuous light amount control signal to the continuous light amount control module, and wherein the continuous light amount control module receives the continuous light amount control signal from the comparison control module and modulates the pulse width of the continuous light output current to output the continuous light generation signal for generating the continuous light with the controlled light amount.

7. The LED stroboscope device of claim 6, wherein the continuous light unit further includes a reverse voltage prevention module provided between the continuous light amount control module and the light emitting unit to prevent a flashing light output current generated from the stroboscope unit from flowing back to the continuous light unit, and wherein the reverse voltage prevention module includes a diode.

8. The LED stroboscope device of claim 7, wherein the light emitting unit includes one light emitting module to generate both the flashing light and the continuous light from a corresponding light emitting module.

9. The LED stroboscope device of claim 8, wherein the control unit includes:

a microcomputer configured to receive power from the power supply unit and set a program function for controlling the stroboscope unit and the continuous light unit, respectively, to detect states of a corresponding stroboscope unit and a corresponding continuous light unit;

a display module configured to display the program function set by the microcomputer and a control state; and a D/A converter module configured to convert a digital signal set by the microcomputer into an analog signal, and wherein the microcomputer detects a charging voltage of the power charging module, outputs a pulse width control signal for adjusting the flashing light amount to have a brightness matching a corresponding charging voltage and a camera exposure value as the flashing light amount control signal, and transmits the flashing light amount control signal to the light amount control module.

* * * * *